(12) United States Patent
Wolsfeld

(10) Patent No.: US 8,152,882 B2
(45) Date of Patent: Apr. 10, 2012

(54) DUST-CATCHER FOR BLAST FURNACE GAS

(75) Inventor: Alfred Wolsfeld, Essen (DE)

(73) Assignee: Paul Wurth S.A., Luxembourg (LU)

( * ) Notice: Subject to any disclaimer, the term of this patent is extended or adjusted under 35 U.S.C. 154(b) by 236 days.

(21) Appl. No.: 12/675,904

(22) PCT Filed: Jul. 22, 2008

(86) PCT No.: PCT/EP2008/059604
§ 371 (c)(1),
(2), (4) Date: Mar. 1, 2010

(87) PCT Pub. No.: WO2009/027155
PCT Pub. Date: Mar. 5, 2009

(65) Prior Publication Data
US 2011/0203234 A1    Aug. 25, 2011

(30) Foreign Application Priority Data
Aug. 29, 2007  (EP) .................................. 07115170

(51) Int. Cl.
*B01D 45/18* (2006.01)
(52) U.S. Cl. ............... 55/428; 55/307; 55/447; 55/434; 55/454; 55/458; 55/463
(58) Field of Classification Search ............... 55/307, 55/447, 434, 454, 458, 428, 463
See application file for complete search history.

(56) References Cited

U.S. PATENT DOCUMENTS

| 4,015,960 | A | * | 4/1977 | Nutter | 55/355 |
| 5,262,046 | A | * | 11/1993 | Forgac et al. | 208/161 |
| 6,468,321 | B2 | * | 10/2002 | Kinsel | 55/457 |
| 7,833,298 | B2 | * | 11/2010 | Larnholm et al. | 55/337 |
| 2005/0011170 | A1 | * | 1/2005 | Christiansen et al. | 55/345 |

FOREIGN PATENT DOCUMENTS

| EP | 1557218 | 7/2005 |
| SU | 787093 | 12/1980 |
| SU | 854996 | 8/1981 |
| WO | 00/40763 | 7/2000 |
| WO | 01/81636 | 11/2001 |
| WO | 2007/000242 | 1/2007 |

OTHER PUBLICATIONS

International Search Report; PCT/EP2008/059604, Sep. 2, 2008.

* cited by examiner

*Primary Examiner* — Jason M Greene
*Assistant Examiner* — Dung H Bui
(74) *Attorney, Agent, or Firm* — Cantor Colburn LLP

(57) ABSTRACT

A conventional dust-catcher for blast furnace gas comprises a pressure vessel, with a gas inlet and outlet dome (14), a separation chamber (16) and a lower dust hopper (18), and a diffuser pipe (26) extending axially through the gas inlet and outlet dome (14) into the separation chamber (16). To increase the separation efficiency of such a dust hopper (18), it is proposed to centrally arrange a flow deflecting chamber (50, 50'), having a smaller cross-section than the separation chamber (16), in the separation chamber (16), so that there remains an annular settlement chamber (52) between the inner wall of the separation chamber (16). The diffuser pipe (26) is connected to this flow deflecting chamber (50, 50') so as to axially discharge a downward gas flow into the top end of the flow deflecting chamber (50, 50'), wherein this downward gas flow is deflected upward. An annular swirling device (58) with guide vanes (60) is arranged in the top end of the flow deflecting chamber (50, 50') around the lower end of the diffuser pipe (26) and acts as outlet opening for the gas flow into the into the pressure vessel of the dust-catcher. The guide vanes (60) form a vortex gas flow rising around the diffuser pipe (26) upward into the gas inlet and outlet dome (14).

10 Claims, 4 Drawing Sheets

DUST-CATCHER FOR BLAST FURNACE GAS

TECHNICAL FIELD

The present invention generally relates to a dust-catcher for blast furnace gas.

BACKGROUND

Most gas cleaning systems of blast furnace plants comprise a preliminary cleaning stage and a fine cleaning stage. The fine cleaning stage generally consists of at least one gas scrubber or electrostatic separator. The object of the preliminary cleaning stage is to remove coarse (large size) dust particles from the gas flow, before the latter enters the fine cleaning stage. Hereby, the preliminary cleaning stage not only increases separation efficiency of the fine cleaning stage, but also makes its operation more reliable and economical. In most blast furnace plants built before the year 2000, the preliminary cleaning stage consists of a so-called dust-catcher.

Such a dust-catcher (see FIG. 1) is a large vertical pressure vessel comprising top-down: a gas inlet and outlet dome, a big cylindrical separation chamber and a funnel-shaped dust hopper. The gas inlet and outlet dome has a gas inlet connection centred on the vertical axis of pressure vessel and a lateral gas outlet connection near the top end of the dome. The axial gas inlet connection is formed by the upper end of a diffuser pipe, which extends axially through the dome into the separation chamber, where it forms an outlet opening in an horizontal plane. The lateral gas outlet connection opens into an annular space surrounding the diffuser pipe within the dome of the dust-catcher.

Operation of such a dust-catcher is as follows. The raw blast furnace gas (i.e. heavily dust charged gas coming from the blast furnace) descends through a large diameter gas pipe, called "down-corner", which is connected from above to the gas inlet connection of the dust-catcher. Through the diffuser pipe, the raw gas flow is axially introduced into the separation chamber of the dust-catcher. The increase in cross-section on entry of the gas into the separation chamber results in a considerable reduction of its velocity. In the separation chamber, the gas flow has furthermore to reverse its flow direction from downward to upward, because the sole gas outlet connection of the dust-catcher is located in the dome of the latter. Due to the reduction of velocity and the 180° reversal of flow direction in the separator chamber, the coarsest dust particles fall out by gravity and are collected in the funnel-shaped dust hopper. From here, dust is discharged out of the dust-catcher through a dust discharging lock connected to the bottom end of the funnel-shaped dust hopper. The pre-cleaned gas flow leaves the dust-catcher through the lateral gas outlet connection in the dome.

A conventional dust-catcher as described hereinbefore has a separation efficiency of only 40-50% of the total dust content. This rather poor separation efficiency is not sufficient for an efficient and economical operation of a fine cleaning stage complying with present environmental protection requirements. In modern gas cleaning systems of new blast furnace plants, the preliminary cleaning stage is therefore most often a tangential or an axial cyclone, which have a fare better separation efficiency than a dust-catcher.

An axial cyclone dust separator for a blast furnace gas cleaning system is disclosed in WO 00/40763. This modern dust separator comprises a vertical pressure vessel with an axial feed device for the blast furnace gas at its top end. This axial feed device includes two upward projecting inlet connection pipes for the raw blast furnace gas and a central outlet connection pipe for the pre-cleaned gas. The two inlet connection pipes open into the dome of the pressure vessel, laterally of the central outlet connection pipe. A downward expanding inlet bell is arranged below the dome of the pressure vessel an guides the gas flow towards an annular gap formed between the bottom edge of the inlet bell and the outer wall of the pressure vessel. A swirling device with guide vanes, which is arranged in this annular gap, causes the blast furnace gas to swirl about the vertical axis of the pressurized vessel. Centrifugal forces project the dust particles radially outward, where they collide with the outer wall and then slide downward through a funnel into a dust hopper. The gas flow reverses its downward spiral on a deflection cone located in front of the outlet opening of the aforementioned funnel and moves upward in a smaller inner spiral. The central outlet connection pipe axially traverses the inlet bell and has its inlet opening located below the latter. Through this inlet opening, the upward moving gas flow enters into the central outlet connection pipe through which it axially leaves the dust separator. It will be appreciated that an axial cyclone dust separator of this type achieves a separation efficiency of up to 85% of the total dust content.

Such an axial cyclone separator is consequently a very interesting solution for new blast furnace gas cleaning plants. If one has to revamp an existing blast furnace gas cleaning plant including a conventional dust-catcher, WO 00/40763 suggests to insert an axial cyclone separator without dust hopper into the truncated pressure vessel of the dust catcher, such that the dust hopper is formed by the pressure vessel of the dust catcher. This solution is of course less expensive than completely replacing the conventional dust-catcher by an entirely new axial cyclone separator, but is sometimes still too expensive, if the client has only a limited budget for environmental protection measures.

In case of a revamping of an existing blast furnace gas cleaning plant including a conventional dust-catcher, it would be particularly advantageous to increase the separation efficiency of the conventional dust-catcher without modifications to its pressure vessel. It will indeed be appreciated in this context, that modifications to the pressure vessel are particularly costly, because they require a new pressure certification of the latter.

A solution for increasing the separation efficiency of an existing dust-catcher without modifications to its pressure vessel is disclosed in EP 1557218. This solution consists in mounting several relatively small tangential cyclones within the unmodified pressure vessel of a conventional dust-catcher. Each of these small tangential cyclones consists of an outer tube, a coaxial inner tube and a tangential feed pipe. The latter penetrates at the top end of the outer tube into the annular space delimited between the outer and inner tube. The lower end of the axial diffuser pipe of the dust-catcher is equipped with a central distribution chamber around which the small tangential cyclones are arranged. The blast furnace gas flows through the axial diffuser pipe into this distribution chamber and enters through the tangential feed pipes into the cyclones. Here, the gas is subjected to a spiral downward movement. Dust particles in the gas, which are subjected to centrifugal forces in this spiral downward movement, separate from the gas flow and discharge through the open base of the cyclone into the funnel-shaped end of the dust-catcher. The pre-cleaned gas flows through the inner tubes of the cyclones into the space surrounding the axial diffuser pipe and leaves the dust-catcher through the outlet connection of its pressure vessel. A drawback of the solution disclosed in EP 1557218 is e.g. that dust may also accumulate in the space surrounding the axial diffuser pipe, which has—with the exception of the inner tubes of the cyclones—no communication with the dust hopper of the dust-catcher.

BRIEF SUMMARY

The disclosure provides an improved solution for increasing the efficiency of an existing conventional dust-catcher without modifications to its pressure vessel.

The disclosure concerns a conventional dust-catcher for blast furnace gas comprising a pressure vessel, with a gas inlet and outlet dome, a separation chamber and a lower dust hopper, wherein a diffuser pipe extends axially through the gas inlet and outlet dome into the separation chamber. In accordance with the present invention, this conventional dust-catcher is modified as follows.

A flow deflecting chamber, having a smaller cross-section than the separation chamber, is centrally arranged in the separation chamber, so that there remains an annular settlement chamber between the inner wall of the separation chamber and the flow deflecting chamber. The diffuser pipe is connected to this flow deflecting chamber so as to axially discharge a downward gas flow into the top end of the flow deflecting chamber, wherein this downward gas flow is deflected upward. An annular swirling device with guide vanes is arranged in the top end of the flow deflecting chamber around the lower end of the diffuser pipe, so as to form a vortex gas flow rising around the diffuser pipe into the gas inlet and outlet dome. In this rising vortex gas flow, dust particles are subjected to centrifugal forces, which project at least coarser dust particles radially outward. Here, i.e. around the main rising vortex gas flow, a descending secondary vortex gas flow acts on the dust particles. Due to this descending secondary vortex gas flow and to gravity forces, at least coarser dust particles sink into the annular settlement chamber and fall through the latter, in which there is basically no gas flow, directly into the dust hopper. It will be appreciated that the above-described modification substantially increases the separation efficiency of an existing conventional dust-catcher without modifications to its pressure vessel. Furthermore, inside the pressure vessel, the separation chamber and the gas inlet and outlet dome remain in direct communication with the lower dust hopper through the annular settlement chamber, through which dust separated from the gas flow falls directly into the dust hopper.

To warrant a good separation efficiency, the outer diameter D1 of the deflecting chamber and the inner diameter D3 of the separation chamber should ideally verify following relation: $(0,40*D3) \leq D1 \leq (0,60*D3)$.

If D1 is the outer diameter of the deflecting chamber, D3 the inner diameter of the separation chamber, and if the gas inlet and outlet dome has a cylindrical main section with an inner diameter D2<D3, then it is recommended that D1 be approximately equal to D2.

The flow deflecting chamber advantageously includes a cone-shaped deflector for deflecting the downward gas flow upward into the annular swirling device.

If gas velocity in the flow deflecting chamber is rather high, it is not very likely that important quantities of dust accumulate therein. Consequently, the flow deflecting chamber may have a closed lower end without dust discharge openings therein. However, it is also possible to arrange cleaning means in the closed lower end of the flow deflecting chamber, for a periodic discharge of dust settling within the flow deflecting chamber.

Alternatively, the flow deflecting chamber may have an open, preferably funnel-shaped, lower end extending into the lower funnel-shaped dust hopper. During normal operation, this open lower end is closed for the gas by the bulk of dust in the dust hopper, thereby preventing a gas flow from bypassing the annular swirling device in the top end of the flow deflecting chamber.

The gas inlet and outlet dome of a conventional dust hopper normally has a lower cone-shaped transitional section and an upper cylindrical main section. Such a dome is advantageously equipped with a downward projecting cylindrical collar forming on the inside of the gas inlet and outlet dome a kind of dam between the lower cone-shaped transitional section and the upper cylindrical main section. The object of this dam is to prevent that a boundary flow of gas with a very high dust content, which rises along the inner wall of the cone-shaped transitional section of the dome, enters directly into the upper cylindrical main section of the dome. In other words, the dam deflects the boundary flow of gas/dust establishing along the inner wall of the cone-shaped transitional section downward into the annular settlement chamber. It will be appreciated that this rather simple measure, still further improves separation efficiency of the dust-catcher.

A preferred embodiment of the annular swirling device comprises a plurality of guide vanes, which are arranged in an annular space surrounding the lower end of the diffuser pipe, so as to be individually replaceable from the annular settlement chamber.

BRIEF DESCRIPTION OF THE DRAWINGS

Further details and advantages of the present invention will be apparent from the following detailed but not limiting description of several embodiments with reference to the attached drawings, wherein.

DETAILED DESCRIPTION

Figure 1:
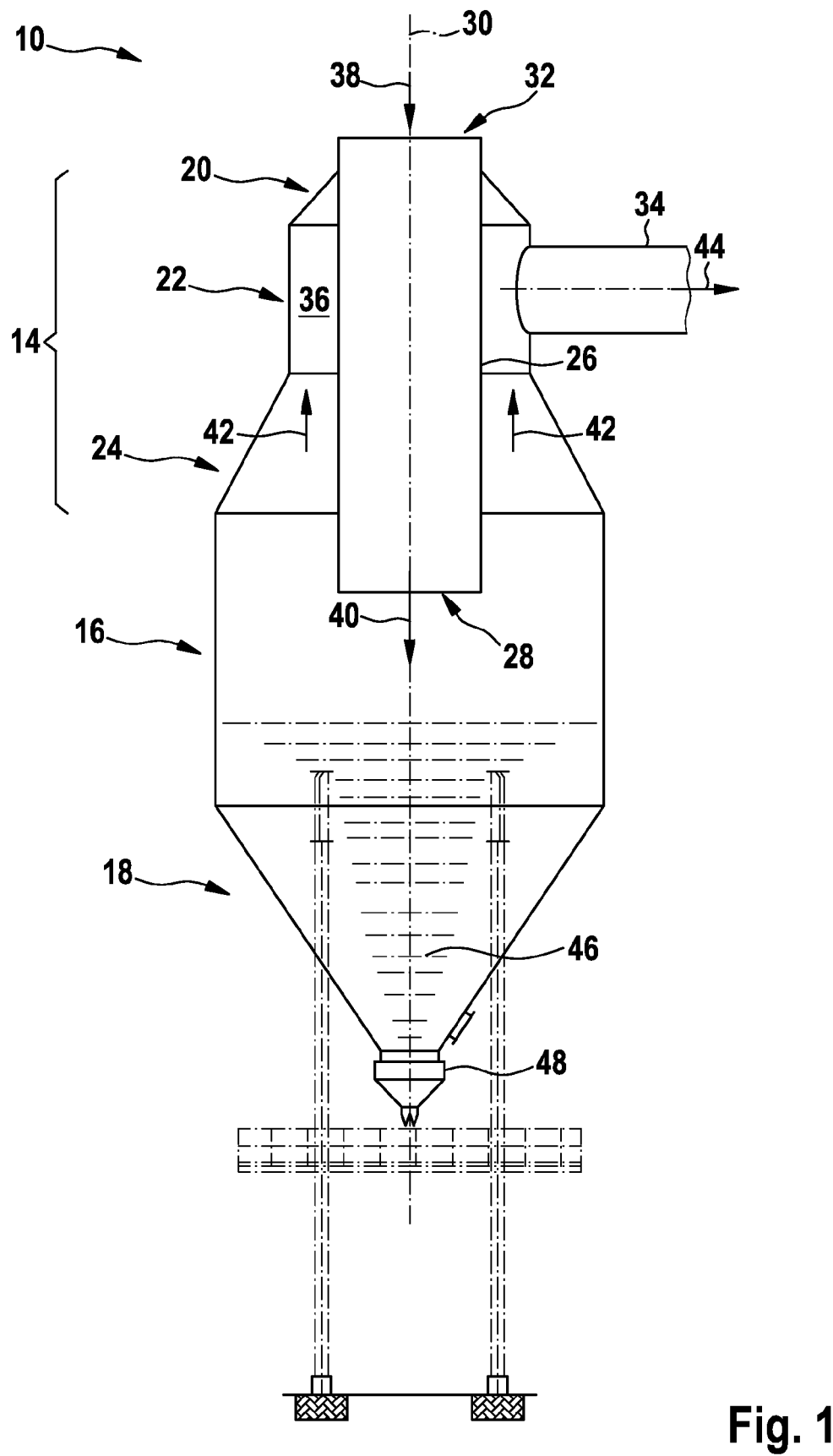
FIG. 1 is a vertical cross sectional view of a conventional dust-catcher.

FIG. 1 shows a vertical cross-section through a conventional dust-catcher 10 of a blast furnace gas cleaning plant. Such a conventional dust-catcher 10 is principally a large vertical pressure vessel comprising top-down: a gas inlet and outlet dome 14, a big cylindrical separation chamber 16 and a funnel-shaped dust hopper 18. The gas inlet and outlet dome 14 comprises top-down: a head end 20, having the form of a truncated cone, a main section 22, having the form of a vertical cylinder, and a transitional section 24, having again the form of a truncated cone. The transitional section 24 connects the dome 14 to the cylindrical separation chamber 16. A diffuser pipe 26 axially penetrates through the head end 20 into the dome 14 and extends axially through the latter into the separation chamber 16. Here, the diffuser pipe 26 forms an outlet opening 28, which is located in an horizontal plane and centred on the vertical axis 30 of the pressure vessel. While the diffuser pipe 26 shown in FIG. 1 has a cylindrical form over its whole length, it will be noted that in some dust-catchers, the diffuser pipe may have a diverging outlet section. The upper end of the diffuser pipe 26 forms a gas inlet connection 32 that is also centred on the vertical axis 30 of the dust-catcher. A lateral gas outlet connection 34 opens through the cylindrical main section 22 of the dome 14 into an annular space 36, which surrounds the diffuser pipe 26 within the dome 14.

Operation of the dust-catcher 10 of FIG. 1 is as follows. The raw (i.e. heavily dust charged) blast furnace gas (see arrow 38) coming from the blast furnace top, descends through a large diameter gas pipe, called "down-corner", which is connected from above to the axial gas inlet connection 32 of the dust-catcher 10. Through the diffuser pipe 26, the raw gas flow is axially introduced into the separation chamber 16 of the dust-catcher 10 (see arrow 40). The increase in cross-section on entry of the gas into the separation chamber 16, results in a considerable reduction of its velocity. Furthermore, in the separation chamber 16, the gas flow has to reverse its flow direction from downward to upward, before it may leave the dust catcher through the gas inlet and outlet dome 14 (see arrow 42). Due to the reduction of velocity and the reversal of flow direction, the coarsest dust particles fall out by gravity and are collected in the dust hopper 18 (reference number 46 identifies the dust collected in the dust hopper 18). The dust 46 collected in the dust hopper 18 is discharged out of the dust-catcher 10 through a dust discharging lock 48, which is connected to the bottom end of the funnel-shaped dust hopper 18. A pre-cleaned gas flow (see arrow 44) leaves the dust-catcher 10 through lateral gas outlet connection 34 in the dome 14.

Figure 2:
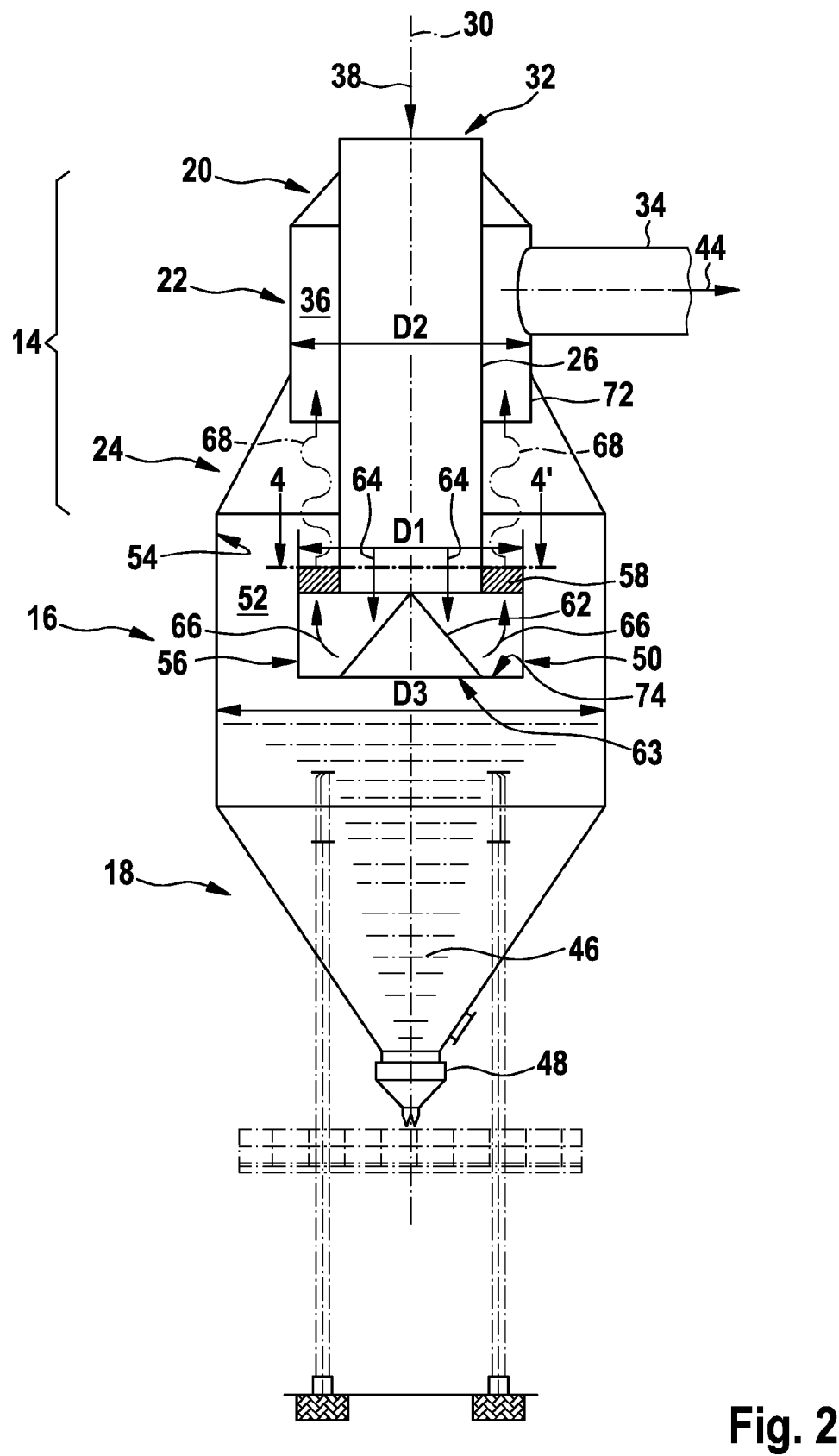
FIG. 2 is a vertical cross sectional view of the conventional dust-catcher of FIG. 1, which has been modified in accordance with a first embodiment of the present invention.

FIG. 2 shows a vertical cross-section through the conventional dust-catcher 10 of FIG. 1 that has been modified in accordance with the present invention. Reference number 50 identifies a cylindrical flow deflecting chamber that is centrally arranged in the separation chamber 16 and has a smaller cross-section than the latter, so that there remains an annular settlement chamber 52 between the inner wall 54 of the separation chamber 16 and the outer wall 56 of the flow deflecting chamber 50, that is in direct communication with the dust hopper 18. It will be noted that the outer diameter D1 of the flow deflecting chamber 50 is advantageously equal to or smaller than the inner diameter D2 of the cylindrical main section 22 of the gas inlet and outlet dome 14. More generally, the outer diameter D1 of the flow deflecting chamber 50 should be between 40% and 60% of the inner diameter D3 of the separation chamber 16.

The diffuser pipe 26 is connected to this flow deflecting chamber 50, so as to axially discharge a downward gas flow into the top end of the flow deflecting chamber 50 (as is schematically indicated by arrows 66), wherein this downward gas flow is deflected upward (as is schematically indicated by arrows 66).

Figure 4:
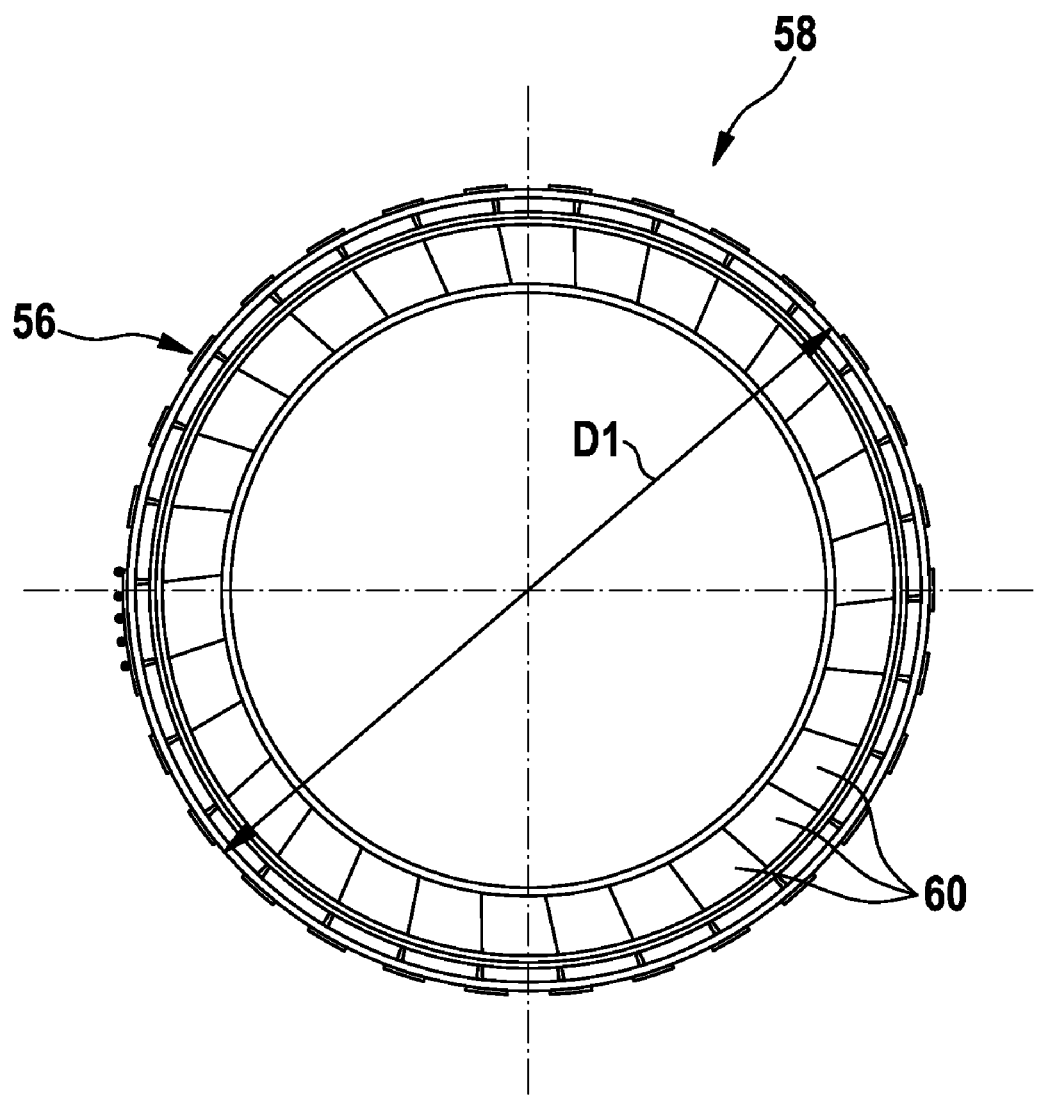
FIG. 4 is a cross sectional view along section plane 4-4' identified in FIG. 2 and FIG. 3.

An annular swirling device 58 surrounds the lower end of the diffuser pipe 26 in the top end of the flow deflecting chamber 50. As shown in FIG. 4, this annular swirling device 58 comprises a plurality of partially overlapping guide vanes 60, which are arranged in an annular space surrounding the outlet opening of the diffuser pipe 26. The outside diameter of this annular space is substantially equal to the outer diameter D1 of the flow deflecting chamber 50, so that the annular swirling device 58 forms an annular top surface of the flow deflecting chamber 50 around the diffuser pipe 26. Each of the guide vanes 60 is advantageously inserted laterally from the annular settlement chamber 52, through a slit in the outer wall 56 of the flow deflection chamber 50, into the swirling device 58. A suitable swirling device 58, in which the guide vanes 60 are individually exchangeable, is e.g. described in greater detail in WO 00/40763 A1.

Opposite the outlet opening of the diffuser pipe 26 is located a cone-shaped deflector 62 for the gas flow in the flow deflecting chamber 50. This deflector 62 is designed to deflect the downward gas flow leaving the diffuser pipe 26 upward towards the annular swirling device 58. It will be noted that the deflector 62, the inner walls of the flow deflecting chamber 50, the guide vanes 60 and all other parts which are exposed to heavy abrasion by the blast furnace dust are, of course, provided with a wear lining composed e.g. of a ceramic material.

Operation of the modified dust-catcher of FIG. 2 is as follows. The raw blast furnace gas descends through the diffuser pipe 26 into the flow deflecting chamber 50 (see arrows 64 indicating the downward gas flow leaving the diffuser pipe 26). The deflector 62 deflects this downward gas flow 64 upward towards the annular swirling device 58 (see arrows 66 indicating the upward gas flow generated by the deflector 62). The upward gas flow 66 traverses the annular swirling device 58, wherein the guide vanes 60 form a vortex gas flow 68 rising around the diffuser pipe 26 into the gas inlet and outlet dome 14. In this vortex gas flow 68, dust particles are subjected to centrifugal forces, which project dust particles radially outward. Here, i.e. around the main rising vortex gas flow 68, a descending secondary vortex gas flow acts on the dust particles. Due to this descending secondary vortex gas flow and to gravity forces, at least coarser dust particles sink into the annular settlement chamber 52 and fall through the latter, in which there is basically no gas flow, directly into the dust hopper 18. The rising vortex gas flow 68 traverses the cone-shaped transitional section 24 of the dome 14 and enters into the annular space 36. Arrow 44 indicates a pre-cleaned gas flow leaving the dust-catcher 10 through its lateral gas outlet connection 34.

Still referring to FIG. 2, it will be noted that a downwardly projecting cylindrical collar 72 forms, on the inside of the dome 14, a kind of dam between the lower cone-shaped transitional section 24 and the upper cylindrical-shaped main section 22. The object of this dam 72 is to prevent that a boundary flow of gas with a very high content of dust particles, which rises along the inner wall of the cone-shaped transitional section 24 of the dome 14, enters directly into the upper cylindrical main section 22. In other words, the dam 72 deflects the boundary flow of gas/dust establishing along the inner wall of the cone-shaped transitional section 24 downward into the annular settlement chamber 52.

The flow deflecting chamber 50 of the dust-catcher shown in FIG. 2 has a closed bottom surface 74 around the cone-shaped deflector 62. Due to the high gas velocities within the flow deflecting chamber 50, an excessive dust accumulation on the bottom surface within this chamber 50 is not expected, at least not under normal operating conditions. However, in order to prevent dust accumulation within the flow deflecting chamber 50 under adverse operating conditions, one may foresee cleaning devices (not shown) in the closed bottom surface 74 of the flow deflecting chamber 50 around the lower rim 63 of the cone-shaped deflector 62. These cleaning devices are then periodically opened in order to discharge dust, which may have accumulated in the flow deflecting chamber 50, into the dust hopper 18.

Figure 3:
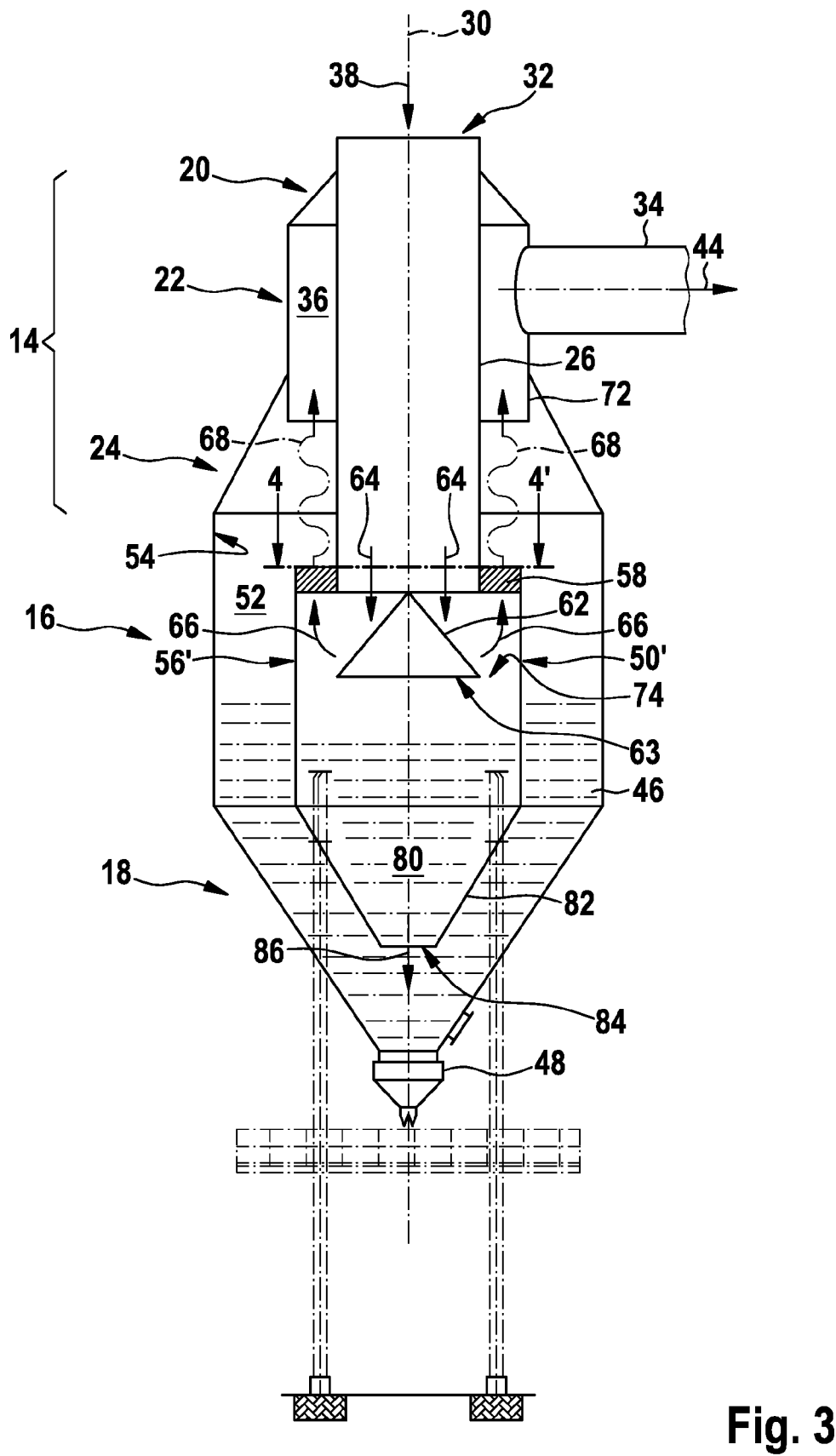
FIG. 3 is a vertical cross sectional view of the conventional dust-catcher of FIG. 1, which has been modified in accordance with a second embodiment of the present invention.

FIG. 3 shows a vertical cross-section through the conventional dust-catcher 10 of FIG. 1 that has been modified in accordance with an alternative embodiment of the present invention. According to this alternative embodiment, the flow deflecting chamber 50', which is in its upper part identical to the flow deflecting chamber 50, has an open bottom around the cone-shaped deflector 62. Furthermore, the lateral cylindrical wall 56' of the flow deflecting chamber 50' extends beyond the lower edge 63 of the cone-shaped deflector 62 over the hole height of the separation chamber 16, to provide under the cone-shaped deflector 62 a separate dust collecting chamber 80. A funnel-shaped outlet section 82 with an outlet opening 84, extends this separate dust collection chamber 80 downward into the dust hopper 18.

With the dust-catcher 10 modified in accordance with FIG. 3, dust particles settling within the flow deflecting chamber 50' accumulate in the separate dust collecting chamber 80 located below the deflector 62. During normal operation of the dust-catcher, the outlet opening 84 of the funnel-shaped outlet section 82 is closed for gas flow by the bulk of dust in the funnel-shaped dust hoper 16 of the old dust-catcher and in the funnel-shaped outlet section 82 of the new separate dust collecting chamber 80. Hence, during normal operation, gas may leave the flow deflecting chamber 50' only through the swirling device 58 and not through the outlet opening 84 of the funnel-shaped outlet section 82. Arrow 86 indicates how dust collected in the separate dust collecting chamber 84 may flow through the outlet opening 84 into the lower part of the dust hopper 18, from where it may be discharged through the dust discharging lock 48 out of the dust-catcher 10.

Apart from the structural and operational differences mentioned hereinbefore, the description of FIG. 2 is, mutatis mutandis, applicable to FIG. 3. It remains however to be noted that with the embodiment of FIG. 3, it is principally possible to deliberately design the flow deflecting chamber 50' and/or the deflector 62 and/or the swirling device 58, so that a certain dust proportion already settles within the flow deflecting chamber 50'. With the embodiment of FIG. 2, it is however recommended to design the flow deflecting chamber 50' and the deflector 62 so that no dust or only a small quantity of dust settles within the flow deflecting chamber 50'.

For modifying a conventional dust-catcher 10 in accordance with the present invention, one proceeds advantageously as follows. The flow deflecting chamber 50 or 50', the annular swirling device 58 and the deflector 62 are designed so as to be composed of individual components that are small enough to be introduced through an existing revision opening (not shown) into the pressure vessel of the dust-catcher 10. These individual components are then introduced through this revision opening into the separation chamber 16 of the dust-catcher 10 and are therein reassembled to form the flow deflecting chamber 50, 50', with the deflector 62 therein, and the annular swirling device 58. The annular swirling device 58 is connected to the lower end of the diffuser pipe 26, and the flow deflecting chamber 50, 50' is supported within the separation chamber 16. If necessary, the lower end of diffuser pipe 26 may be shortened beforehand or even replaced by a pipe section with a smaller or bigger outlet opening, as required.

It will be appreciated that modifying a conventional dust-catcher 10 in accordance with the present invention does not necessitate any modification of its pressure vessel and/or of its existing axial connection to the down-corner. Furthermore, the fact that the flow deflecting chamber 50, 50' has a smaller cross-section than the separation chamber 16, as well as the fact that the flow deflecting chamber 50, 50' is surrounded by the rather spacious annular settlement chamber 52, greatly facilitate the implementation of the present invention in an existing dust-catcher and also facilitate its maintenance.

The invention claimed is:

1. A dust-catcher for blast furnace gas comprising:
    a pressure vessel with a gas inlet and outlet dome,
    a separation chamber
    a lower dust hopper,
    diffuser pipe extending axially through the gas inlet and outlet dome into the separation chamber;
    a flow deflecting chamber, having a smaller cross-section than the separation chamber, is centrally arranged in the separation chamber, so that there remains an annular settlement chamber between an inner wall of the separation chamber and the flow deflecting chamber;
    wherein the diffuser pipe is connected to the flow deflecting chamber so as to axially discharge a downward gas flow into a top end of the flow deflecting chamber, wherein this downward gas flow is deflected upward; and
    an annular swirling device with guide vanes is arranged in the top end of the flow deflecting chamber around a lower end of the diffuser pipe, so as to form a vortex gas flow rising around the diffuser pipe upward into the gas inlet and outlet dome.

2. The device as claimed in claim 1, wherein the deflecting chamber has an outer diameter D1 and the separation chamber has an inner diameter D3 and: $(0,4*D3) \leq D1 \leq (0,6*D3)$.

3. The device as claimed in claim 1, wherein the deflecting chamber has an outer diameter D1, the separation chamber has an inner diameter D3, and the gas inlet and outlet dome has a cylindrical main section with an inner diameter $D2<D3$, and: $D1 \leq D2$.

4. The device as claimed in claim 1, comprising in the flow deflecting chamber a cone-shaped deflector for the gas flow.

5. The device as claimed in claim 1, wherein the flow deflecting chamber has a closed lower end.

6. The device as claimed in claim 5, wherein motorized discharge gates are arranged in the closed lower end of the flow deflecting chamber.

7. The device as claimed in claim 1, wherein the flow deflecting chamber has an open lower end extending into the lower funnel-shaped dust hopper.

8. The device as claimed in claim 7, wherein the open lower end is funnel-shaped.

9. The device as claimed in claim 1, wherein:
    the gas inlet and outlet dome has a lower cone-shaped transitional section and an upper cylindrical main section; and
    a downwardly projecting cylindrical collar forms on the inside of the gas inlet and outlet dome a dam between the lower cone-shaped transitional section and the upper cylindrical main section.

10. The device as claimed in claim 1, wherein the annular swirling device comprises a plurality of guide vanes, which are arranged in an annular space surrounding the lower end of the diffuser pipe, so as to be individually replaceable from the annular settlement chamber.

\* \* \* \* \*